Figure 1:
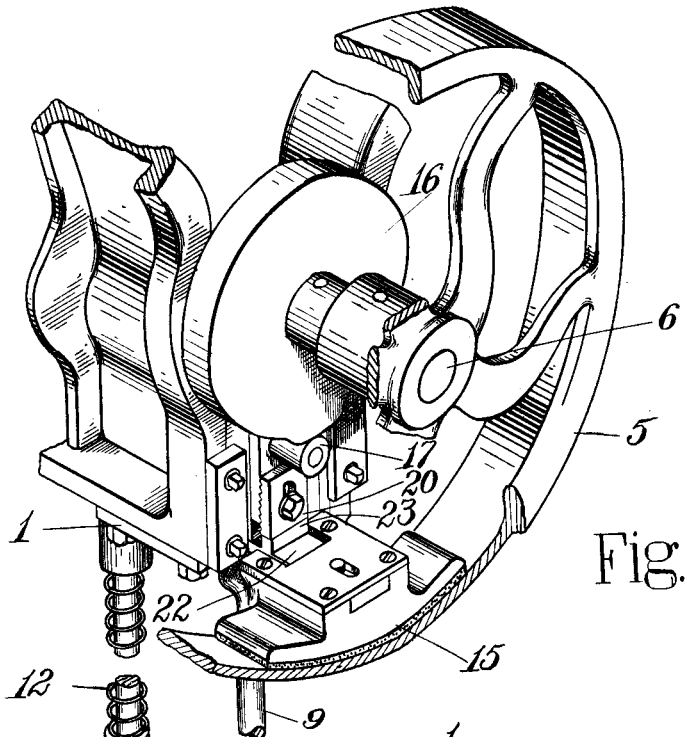

R. F. McFEELY.
CONTROLLING MECHANISM FOR MACHINERY.
APPLICATION FILED NOV. 17, 1913.

1,193,576.

Patented Aug. 8, 1916.
2 SHEETS—SHEET 1.

WITNESSES.
Edith C. Holbrook
Elizabeth C. Coupe

INVENTOR.
Ronald F. McFeely
By his Attorney
Nelson W. Howard

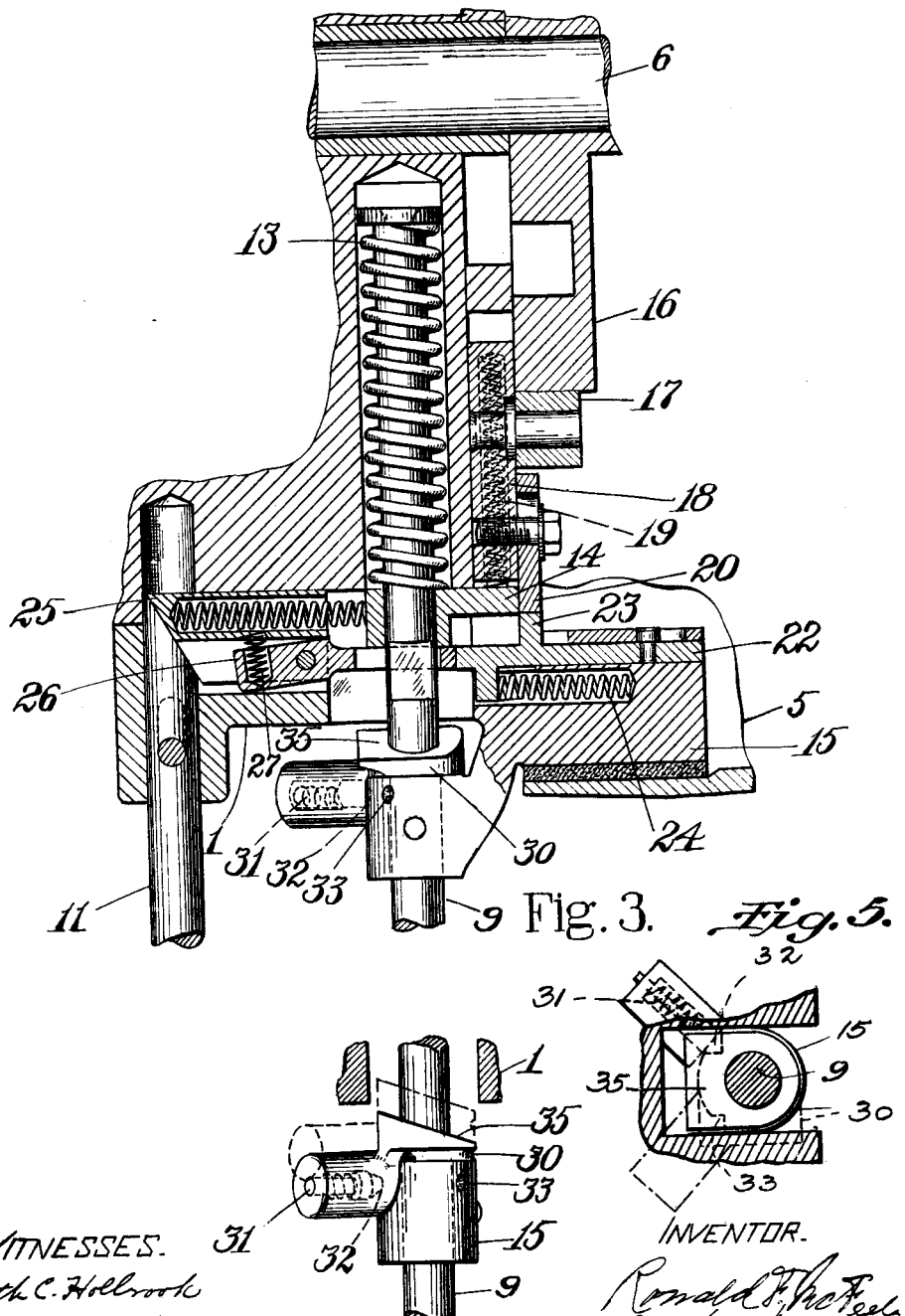

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

CONTROLLING MECHANISM FOR MACHINERY.

1,193,576.     Specification of Letters Patent.     Patented Aug. 8, 1916.

Application filed November 17, 1913. Serial No. 801,502.

*To all whom it may concern:*

Be it known that I, RONALD F. MCFEELY, a citizen of the United States, residing at Beverly, in the county of Essex and State of Massachusetts, have invented certain Improvements in Controlling Mechanisms for Machinery, of which the following description, in connection with the accompanying drawings, is a specification, like reference characters on the drawings indicating like parts in the several figures.

This invention relates to machine controlling mechanisms including starting and stopping mechanism and is herein embodied in a mechanism of the type shown and described in prior United States Letters Patent No. 791,986, granted June 6, 1905 on an application originally filed by me Sept. 19, 1899.

An object of the present invention is to extend the usefulness of mechanisms of the type therein shown.

The mechanism of my former invention includes a controller described on page 2, lines 64–89 which is capable of being set to render the clutch non-responsive to depression of the starting treadle. This is very important, especially in a highly organized machine in which there are liable to be frequent times when it is desirable to adjust or work upon the machine by hand and the danger of injury to the operator would be great if the machine were so left that it could be accidentally started. The described safety controlling device eliminated this danger. In the practical use, under widely varying conditions, of the pulling-over machine into which this mechanism has been incorporated, including the pulling-over of the most difficult of shoes, it occasionally happens that the machine is unable to complete its cycle after the starting treadle has been depressed. This may be caused by an obstruction or overload or by the driving belt running off. Interruptions like this are liable to happen occasionally in the use of all machines and the safety device of the prior patent is incapable of adjustment to bring it into use at such a time. There has therefore been some peril in working about the machine to start it under such conditions. By the present invention a controller is provided which can be used at any stage in the machine's cycle to disconnect the power from the machine after which the machine can be safely manipulated by hand and the belt can be more easily re-applied to the driving pulley because the pulley is then free of the load of the machine.

The features of the invention, including certain combinations of parts and more important details of construction, will be now described with the aid of the annexed drawings and the invention will then be particularly pointed out in the claims.

Figure 2:
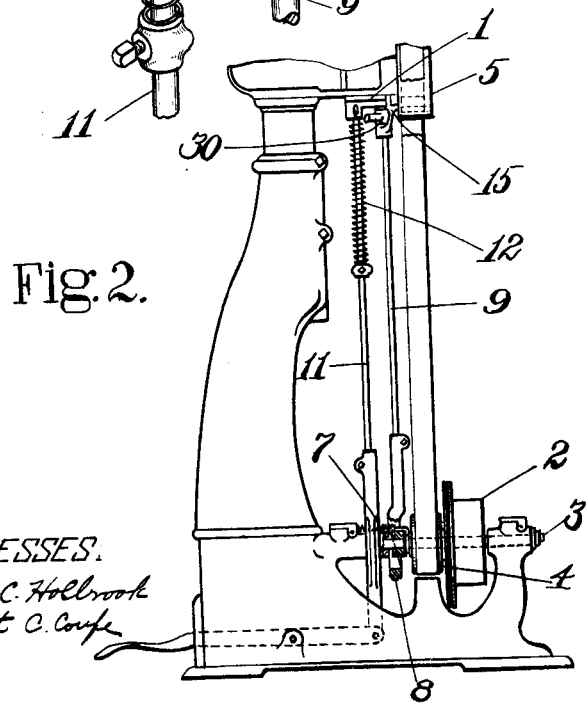

Figure 1 is a perspective view of a machine equipped with this invention. Fig. 2 is a side elevation of the entire column and lower portion of the machine. Fig. 3 is a vertical section from front to back. Fig. 4 is a detail at right angles to Fig. 3. Fig. 5 is a plan view, partly in section, of a portion of the machine.

The driving and the starting and stopping mechanisms as a whole will first be described briefly, in order that the improved safety controlling device may be better understood, and reference may be had to said prior patent for a more complete description of said mechanisms. The driving pulley 2 is mounted on a clutch shaft 3 in the base of the machine and with a friction disk on that pulley coöperates a friction disk on the adjacent sleeve pulley 4 that is connected by a belt as shown in Fig. 1 with the pulley 5 on the cam shaft 6 in the head of the machine. A spring 7 is arranged to pull the pulley 4 away from the driving pulley and maintain the friction faces of the clutch normally separated while a wedge 8 can be caused by treadle 10 to close the clutch. The starting treadle 10 is connected indirectly to the wedge 8 through treadle rod 11 and wedge rod 9. A spring 12 on the treadle rod serves to maintain the treadle upraised, and a spring 13, Fig. 3, arranged between the head of wedge rod 9 and a ledge 14 operates, when allowed to do so, to lift the wedge rod and start the machine. The wedge rod also carries the brake shoe 15 which is therefore lifted by the spring 13. The depression of rod 9 to allow the clutch to be opened by spring 7 and to apply the brake shoe is effected automatically by a cam 16, Fig. 3, on the shaft 6, acting through a roll 17 projecting from a slide 18 which is normally upraised by springs 19, shown in dotted lines. The slide 18 has an adjustable foot plate 20 which acts through slide 22 that is horizontally movable in the brake shoe 15. A spring 24 holds the slide where an upstanding rib 23 is under the foot plate of the depressing slide 18 as shown in Fig. 3 where the machine is shown at rest with the brake applied. For lifting the brake and closing the clutch while the stopping cam is in brake applying position the treadle connections are arranged to thrust the slide 22 toward the right far enough to remove lip 23 from under the depressing slide, whereupon spring 13 lifts wedge rod 9 to raise the brake and cause wedge 8 to close the clutch. Either the brake or the power mechanism is normally in control of the machine and there is no chance for any overthrow of any of the cams beyond normal stopping position.

The upper end of the treadle rod is guided through a plate 1 rigidly fixed to the lower face of the head of the machine and its upper end is beveled so as to apply thrust toward the right to a slide 25. The slide 25 carries a lever 26 which is slotted to embrace the rod 9 and is held by a spring 27 with its right hand end in abutting engagement with the left hand end of slide 22. Lateral thrust by treadle rod 11 is transmitted through slide 25 and lever 26 to move rib 23 laterally from under slide 20 and allow the brake to be lifted and the clutch closed by expansion of spring 13 acting through rod 9. The rod 9 has a rotatable collar 30 resting upon the attaching portion of the brake shoe 15 and provided with a handle extension by which it can be turned through about 90° and a spring pin 31 coöperating with recesses 32, 33, will hold it in adjusted position. This collar has a shape such as illustrated most clearly in Figs. 3 and 5, and is of a width approximately corresponding to the width of the opening in plate 1, so that when the collar is turned so as to seat the pin 31 in the recess 32 it may enter the opening in the plate 1 and offer no obstruction to the elevation of the rod 9 by the spring 13. The collar 30, however, is elongated at one end so that its length is greater than the width of the opening in the plate 1, and therefore when the collar is turned so as to seat the pin 31 in the recess 33 the collar cannot enter said opening but will constitute a stop or safety device in position to engage the plate or abutment 1 so as to prevent such elevation of the rod 9 as will move the wedge 8 far enough to close the clutch.

Such was the construction of the machine in accordance with said prior patent to which reference may be made for further details. Also in said patent the upper face of collar 30 forming the safety device was a plane face substantially parallel throughout its width to the lower edge of the plate 1. This precluded the possibility of turning the safety device after it had been lifted by spring 13 into the hole in plate 1, that is, after the treadle had been once depressed to start the machine and until the cam shaft had turned far enough to depress the brake shoe again. This limited the use of the safety device to those times when the machine had been brought to rest automatically at one of its normal stopping points. The present improvements comprise two changes in the safety device. In the first place the safety device 30 has been formed with a wedge face 35 on its upper side, sloping in a direction widthwise of the device, as shown in Figs. 3 and 4, and of such a pitch that one side edge of this face will at all times be located below the lower edge of the plate 1. The collar 30 is curved at one end, as shown, on a radius that is no greater than half the width of the opening in plate 1, and this form and the shape of the face 35 permit the collar to be turned relatively to the plate 1 while it stands in the opening in said plate. During such turning movement the wedge or cam face 35 of the collar will engage the lower edge of the plate or abutment 1 at one side of the rod 9, thereby causing the collar and the rod to be depressed against the lift of spring 13, to withdraw the wedge 8 far enough to enable spring 7 to open the clutch, Fig. 2. This allows use of the safety device when the machine becomes stopped between its normal stopping positions, as illustrated by the dotted line position of the safety device in Fig. 4, and eliminates the danger that if the operator endeavored to assist the power mechanism to start the machine, or if he made any change in the machine or adjustment of the work to relieve the obstruction, the power mechanism would start the machine suddenly and injure the operator. Furthermore, the collar constituting the safety device is made only thick enough, or is located at an altitude with relation to the lower face of plate 1, so that it will depress rod 9 only far enough to render the clutch inoperative without applying the brake. The machine can thus at any time be put into condition for safe handling by the operator without danger that the power mechanism will move any part of the machine in a way to cause injury or damage, the machine being at such time free from the brake as well as from the power and can be turned by hand through any portion of its cycle or through repeated cycles.

Having explained the nature of this invention and described a preferred embodiment of the same, what I claim as new and desire to secure by Letters Patent of the United States is:—

1. In a controlling mechanism for machinery, a clutch; a brake; normal controlling means therefor including a rod, a spring arranged to impart a clutch closing and brake lifting movement to the rod, a plate through which the rod is guided and having a hole larger than the rod; a safety device rotatable on the rod and shaped to be moved by the rod into the hole in the plate when the clutch is closed if the device occupies one angular position on the rod and to prevent clutch closing movement of the rod if the device occupies another angular position on the rod, and means for turning said device, said safety device having a cam face coöperating with said plate to depress the rod against the stress of said spring and lock the rod in a position in which the clutch is open and cannot be closed.

2. In a controlling mechanism for machinery, a clutch; a brake; normal controlling means therefor including a rod, a spring arranged to impart a clutch closing and brake lifting movement to the rod; and a safety device constructed and arranged for manual operation to depress the rod against the stress of the spring and lock it in a position in which the clutch is open and cannot be closed.

3. In a controlling mechanism for machinery, a clutch; a brake; normal controlling means operating to close the clutch and release the brake and thereafter to open the clutch and apply the brake; and normally idle means arranged to be operated in the event of stopping of the parts with the clutch in closed position for opening the clutch while the brake is released.

4. In a controlling mechanism for machinery, a clutch; a brake; normal controlling means including mechanism normally tending to close the clutch and release the brake and arranged to operate after the clutch has been closed to open the clutch and apply the brake; and means to open the clutch independently of said normal controlling means.

5. In a controlling mechanism for machinery, a clutch; a brake; normal controlling means comprising mechanism normally tending to close the clutch and release the brake and including automatic means arranged to operate after the clutch has been closed to open the clutch and apply the brake; and additional means for manually opening the clutch in the event of stopping of the parts with the clutch in closed position.

6. In a controlling mechanism for machinery, a clutch; a brake; normal controlling means operating to close the clutch and release the brake including a rod, a clutch closing wedge operated by the rod, a spring under stress arranged to actuate the rod and therethrough to actuate the clutch closing wedge and the brake, means to restrain the spring from operating, a treadle connection for releasing the spring, and a cam for automatically moving the rod in opposition to the spring to open the clutch and apply the brake; and manual means for similarly moving the rod in opposition to the spring to open the clutch independently of the cam.

7. A starting and stopping mechanism, comprising a shaft, a clutch member fixed on said shaft, a coöperating clutch member loose on said shaft, an endwise-movable rod, a spring normally contracted and tending to move said rod, a part 22, 23, means for moving said part whereby the spring is rendered effective for moving the rod in one direction to engage the said clutch members, and means independent of said part for moving the rod in the opposite direction to disengage the said clutch members, combined with additional means for moving the rod to disengage said clutch members and locking the rod with the clutch open.

8. In a controlling mechanism for machinery, the combination with a clutch and a brake, of controlling means including a member movable in one direction to close the clutch and release the brake and in the opposite direction to open the clutch and apply the brake, a spring for imparting clutch closing movement to said member, and manually operative means for stopping said member in an intermediate position in which the brake is released, so as to prevent said member from being moved by the spring to close the clutch.

9. A starting and stopping mechanism, comprising a shaft, a clutch member fixed on said shaft, a coöperating clutch member loose on said shaft, a rod, a part 22, 23, means to move said part whereby the rod is rendered movable in one direction for connecting the clutch members, and means to separate the clutch members, combined with means independent of said before-mentioned elements for moving the rod to separate the clutch members and lock the rod.

10. In a controlling mechanism for machinery, the combination with a clutch, of controlling means for said clutch comprising an endwise movable rod, a spring arranged to impart clutch closing movement in one direction to the rod, a safety device carried by the rod and rotatable about the axis thereof, and a relatively stationary member arranged with reference to said device to permit clutch closing movement of the rod when said device is in one angular position with respect to the axis of the rod and to prevent such movement of the rod when the device is in another angular position, said device having a cam face formed and arranged for coöperation with said member upon a turning movement of said device when the clutch is closed to effect the opening of the clutch.

11. In a controlling mechanism for machinery, the combination with a clutch, of controlling means for said clutch comprising an endwise movable rod, a spring arranged to impart clutch closing movement in one direction to the rod, an abutment having portions located at opposite sides of the rod, and a safety device mounted on the rod and rotatable about the axis thereof, said device being of such width as to permit it to pass between the opposite side portions of the abutment when it is in one angular position with respect to the axis of the rod and suitably curved at one end to permit turning movement thereof between said portions of the abutment, said device being extended at its opposite end to a length greater than the distance between said portions of the abutment, and also having that face which is toward the abutment sloping in the direction of the width of the device so as to provide a cam surface in position to engage the abutment upon a turning movement of the device when the clutch is closed, whereby to effect an endwise movement of the rod in the direction to open the clutch.

In testimony whereof I have signed my name to this specification in the presence of two subscribing witnesses.

RONALD F. McFEELY.

Witnesses:
 CHESTER E. ROGERS,
 LAURA M. GOODRIDGE.

Copies of this patent may be obtained for five cents each, by addressing the "Commissioner of Patents, Washington, D. C."